(12) United States Patent
Mizuno et al.

(10) Patent No.: US 11,185,099 B2
(45) Date of Patent: Nov. 30, 2021

(54) INGREDIENT-CONTAINING LIQUID SEASONING PACKED IN A HERMETICALLY SEALED VESSEL

(71) Applicants: MIZKAN HOLDINGS CO., LTD., Aichi (JP); MIZKAN CO., LTD., Aichi (JP)

(72) Inventors: Tatsuya Mizuno, Aichi (JP); Konomi Yoshimoto, Aichi (JP)

(73) Assignees: MIZKAN HOLDINGS CO., LTD., Aichi (JP); MIZKAN CO., LTD., Aichi (JP)

( * ) Notice: Subject to any disclaimer, the term of this patent is extended or adjusted under 35 U.S.C. 154(b) by 76 days.

(21) Appl. No.: 16/527,414

(22) Filed: Jul. 31, 2019

(65) Prior Publication Data

US 2019/0350237 A1 Nov. 21, 2019

Related U.S. Application Data

(63) Continuation of application No. PCT/JP2018/002850, filed on Jan. 30, 2018.

(30) Foreign Application Priority Data

Jan. 31, 2017 (JP) .............................. JP2017-015626

(51) Int. Cl.
*A23L 19/00* (2016.01)
*A23L 5/00* (2016.01)
*A23L 27/40* (2016.01)
*A23L 27/14* (2016.01)
*A23L 27/00* (2016.01)
*A23L 27/21* (2016.01)

(52) U.S. Cl.
CPC ................ *A23L 19/03* (2016.08); *A23L 5/00* (2016.08); *A23L 27/14* (2016.08); *A23L 27/40* (2016.08); *A23L 27/82* (2016.08); *A23L 27/21* (2016.08)

(58) Field of Classification Search
CPC . A23L 19/03; A23L 5/00; A23L 27/40; A23L 27/14; A23L 27/82; A23L 27/21
USPC ....................................................... 426/615
See application file for complete search history.

(56) References Cited

FOREIGN PATENT DOCUMENTS

| CN | 104886603 | A | * | 9/2015 |
|---|---|---|---|---|
| FR | 2767648 | A1 | | 3/1999 |
| JP | H01181764 | A | | 7/1989 |
| JP | H04262759 | A | | 9/1992 |
| JP | H08173082 | A | | 7/1996 |
| JP | H08317771 | A | | 12/1996 |
| JP | H11130 | A | | 1/1999 |
| JP | 2000060476 | A | | 2/2000 |
| JP | 2000197461 | A | | 7/2000 |
| JP | 2007209295 | A | | 8/2007 |
| JP | 2007236213 | A | | 9/2007 |
| JP | 2011152147 | A | * | 8/2011 |
| JP | 2011152147 | A | | 8/2011 |
| JP | 2012170353 | A | | 9/2012 |
| JP | 2013099306 | A | | 5/2013 |
| JP | 2014108085 | A | | 6/2014 |
| JP | 2015050969 | A | | 3/2015 |
| JP | 2016013068 | A | | 1/2016 |
| KR | 101411368 | B1 | * | 6/2014 |

OTHER PUBLICATIONS

Translation of KR101411368 (B1) (Han) (Year: 2014).*
Translation of : JP2011152147 (A) (Year: 2011).*
Translation of CN 104886603 (A) (Juet et al.) (Year: 2015).*
Tressler D. K. et al; "Fruit Butters, Spiced and Pickled Products" The Technology of Food Preservation, 3rd Edition; XP-002062041; Jan. 1, 1976( 1 page).
Extended European Search Report issued in corresponding European Application No. 18747314.5, dated Sep. 15, 2020 (9 pages).
Kojien, 7th edition, "rectangle" (2 pages).
Webpage, "Meaning of Pasteurization," KOTOBANK, retrieved Oct. 5, 2018 (4 pages).
"Behavior and control of bacteria against stress and damage under acidic conditions," 29th Annual Meeting of the Japanese Society of Food Microbiology, Kewpie Corporation, Research Institute, Nobuhiro Sashihara (2 pages).
Webpage, search results of "steamed vegetables,"—kuracil, retrieved Oct. 16, 2018 (4 pages).
International Search Report issued in corresponding International Application No. PCT/JP2018/002850; dated Mar. 6, 2018 (2 pages).
Written Opinion of the International Searching Authority issued in corresponding International Application No. PCT/JP2018/002850; dated Mar. 6, 2018 (6 pages).

* cited by examiner

*Primary Examiner* — Brent T O'Hern
(74) *Attorney, Agent, or Firm* — Osha Bergman Watanabe & Burton LLP

(57) ABSTRACT

An ingredient-containing liquid seasoning packed in a hermetically sealed vessel includes ingredients and a seasoning liquid. The ingredients are swollen in the seasoning liquid, and a size of the swollen ingredients ranges from 3 to 60 mm. The ingredient-containing liquid seasoning includes 20 to 80% by mass of the swollen ingredients on a wet weight basis.

7 Claims, No Drawings

INGREDIENT-CONTAINING LIQUID SEASONING PACKED IN A HERMETICALLY SEALED VESSEL

TECHNICAL FIELD

One or more embodiments of the present invention relate to an ingredient-containing liquid seasoning packed in a hermetically sealed vessel, in which flavor and food texture originally possessed by the ingredients can be sufficiently felt.

BACKGROUND

Conventionally, seasonings having various tastes or forms have been used in salads or prepared foods. Among others, in the case of a seasoning containing ingredients in its seasoning liquid, since ingredients have previously been added into a seasoning liquid, time and effort for, for example, preparing ingredients separately can be saved. Such a seasoning comprises a variety of ingredients, and thus, it can respond to diversified consumer needs. For example, a seasoning prepared by dispersing ingredients such as grated vegetables or finely chopped vegetables in a seasoning liquid to allow the ingredients to absorb the seasoning liquid has been known.

As a method for producing such a liquid seasoning comprising ingredients, a method comprising adding ingredients such as grated vegetables or cut vegetables to a seasoning liquid in advance, dispersing the ingredients by stirring or the like, and filling a vessel with the ingredients has been proposed. For example, a method for producing a liquid seasoning comprising grated vegetables, which is characterized by adding frozen grated vegetables that have been cut to a seasoning liquid during stirring, has been reported (Patent Literature 1). However, according to this method, the frozen grated vegetables are thawed in the seasoning liquid, which cause moisture in the grated vegetables to dilute the taste of the liquid seasoning. Further, the addition of the grated vegetables to the seasoning liquid during stirring causes a pressure on the vegetables due to stirring, resulting in loss of food texture of the grated vegetables. Therefore, the thus obtained liquid seasoning was not satisfactory in terms of both flavor and food texture.

In addition, for the purpose of enhancing workability and the like, methods using dry ingredients have been developed. For example, a method for producing a liquid seasoning containing granular vegetables, which is characterized by adding dried granular vegetables to a seasoning liquid, mixing the liquid by stirring with or without heating to uniformly disperse the dried granular vegetables, heat-sterilizing the mixture, and filling a packaging vessel with the granular vegetables in a state of being dispersed uniformly in the liquid seasoning, has been reported (Patent Literature 2). However, in this method, after adding the vegetables to the seasoning liquid, mixing by stirring with or without heating and heat sterilization is carried out. Such stirring or excessive heat treatment may reduce the flavor of the ingredients and cause the shape of the ingredients to collapse, which results in loss of the original flavor or food texture of the ingredients and poor appearance.

In addition, a method for obtaining a liquid seasoning containing vegetable granules and/or fruit juice, in which raw soy sauce is mixed with a portion of a materials used for the liquid seasoning containing vegetable granules and/or fruit juice, the mixture is heated to 80° C. to 90° C. and then mixed with raw vegetable granules and/or fruit juice, 5'-nucleotide, and the remaining portion of the materials used for the seasoning, and the mixture is further heated at 60° C. to 75° C., has been reported (Patent Literature 3). However, in this method, the vegetable granules are mainly mixed with raw soy sauce and then heat-treated, which prevents the umami taste of the vegetable granules from being extracted into the seasoning liquid. In addition, the ingredients absorb soy sauce, which makes it difficult to add the taste of the entire seasoning liquid and reduces the original taste of the ingredients, resulting in an unsatisfactory flavor of the entire seasoning liquid. Further, the method comprises labor-consuming steps of, for example, adding raw materials in divided portions to a seasoning liquid and performing heat treatment for multiple times in different temperature ranges.

CITATION LIST

Patent Literature

Patent Literature 1: JP Patent Publication (Kokai) No. 8-317771 (1996) A
Patent Literature 2: JP Patent Publication (Kokai) No. 2011-152147 A
Patent Literature 3: JP Patent Publication (Kokai) No. 2013-99306 A

SUMMARY

One or more embodiments of the present invention provide an ingredient-containing liquid seasoning packed in a hermetically sealed vessel, in which the texture of the ingredients is favorably maintained without damage to the ingredients in the production steps, even when the size of the ingredients is large, and the flavor of the ingredients in the liquid seasoning is enhanced by containing a sufficient amount of the ingredients, which leads to excellent flavor of the entire liquid seasoning.

The present inventors conducted various studies regarding raw materials such as ingredients and a seasoning liquid and the treatment of the seasoning liquid containing the ingredients, and found that the ingredients are not damaged and the flavor and food texture originally possessed by the ingredients can be sufficiently felt, by adjusting the size and the content of the ingredients within a specific range and heat-treating the ingredients and the seasoning liquid in an a hermetically sealed vessel under specific conditions. Also, the present inventors found that by performing a mild heat treatment, it becomes possible to enhance a favorable ingredient-derived flavor in the seasoning liquid, thereby realizing a very favorable flavor of the entire liquid seasoning.

Specifically, one or more embodiments of the present invention encompass the following.

(1) An ingredient-containing liquid seasoning packed in a hermetically sealed vessel, wherein the content of the ingredients having a size of 3 to 60 mm after the swelling in the seasoning liquid is 20% to 80% by mass based on the total mass of the liquid seasoning in terms of wet weight.

(2) The ingredient-containing liquid seasoning packed in a hermetically sealed vessel according to (1), wherein the ingredients are dried ingredients.

(3) The ingredient-containing liquid seasoning packed in a hermetically sealed vessel according to (2), wherein the dried ingredients are dried vegetables.

(4) The ingredient-containing liquid seasoning packed in a hermetically sealed vessel according to (3), wherein the dried vegetable is at least one dried vegetable selected from among onions, cabbages, Chinese cabbages, carrots, green onions, celeries, and paprikas.

(5) The ingredient-containing liquid seasoning packed in a hermetically sealed vessel according to any one of (1) to (4), wherein the seasoning liquid contains 80 to 300 ppm of γ-aminobutyric acid.

(6) The ingredient-containing liquid seasoning packed in a hermetically sealed vessel according to any one of (1) to (5), which has a water activity of less than 0.955.

(7) The ingredient-containing liquid seasoning packed in a hermetically sealed vessel according to any one of (1) to (6), which contains a vinegar and/or a common salt or a food product containing a common salt.

(8) The ingredient-containing liquid seasoning packed in a hermetically sealed vessel according to any one of (1) to (7), wherein the hermetically sealed vessel is a wide-mouthed vessel.

(9) A method for producing the ingredient-containing liquid seasoning packed in a hermetically sealed vessel according to any one of (1) to (8), comprising the following steps:

(a) a step of introducing ingredients into a hermetically sealed vessel, adding a seasoning liquid, and then, hermetically sealing the vessel;

(b) a step of subjecting the hermetically sealed vessel filled with the ingredients and the seasoning liquid to a heat treatment at 60° C. to 100° C. for 20 to 120 minutes without stirring; and (c) a step of leaving or cooling the resultant to ordinary temperature after the heat treatment.

(10) A method for cooking a food product for heating cooking using the ingredient-containing liquid seasoning packed in a hermetically sealed vessel according to any one of (1) to (8).

The present description includes part or all of the contents as disclosed in the description and/or drawings of Japanese Patent Application No. 2017-015626 filed on Jan. 31, 2017, which is a priority document of the present application.

According to one or more embodiments of the present invention, it is possible to provide an ingredient-containing liquid seasoning packed in a hermetically sealed vessel, in which flavor and food texture originally possessed by the ingredients can be sufficiently felt, and salty or sour taste can be moderately felt by increasing γ-aminobutyric acid in the seasoning liquid to a specific amount, thereby having an excellent flavor of the entire seasoning. In addition, the use of the liquid seasoning according to one or more embodiments of the present invention in a variety of dishes allows the realization of favorable food texture and flavor of ingredients in the dishes even after cooking.

DETAILED DESCRIPTION OF EMBODIMENTS

The ingredient-containing liquid seasoning packed in a hermetically sealed vessel according to one or more embodiments of the present invention (hereinafter referred to as "liquid seasoning according to one or more embodiments of the present invention") is characterized in that the content of the ingredients having a size of 3 to 60 mm after the swelling in the seasoning liquid is 20% to 80% by mass based on the total mass of the liquid seasoning in terms of wet weight.

As the ingredients used for one or more embodiments of the present invention, raw ingredients, salt-cured ingredients, dried ingredients, or the like can be used. However, in a case in which the ingredients contain moisture and have a bulky volume, it makes it difficult to fill a hermetically sealed vessel with the ingredients. From the view point, dried ingredients may be preferable. In a case in which the ingredients are frozen ingredients, the ingredient-derived flavor is weakened in the liquid seasoning. Here, dried ingredients and other ingredients may be used in combination.

According to one or more embodiments of the liquid seasoning of the present invention, the ingredients may have any shape such as a rectangular solid, cube (dice), spherical, or granular shape. In addition, the "size of the ingredients" means the length of the ingredients after the swelling in a seasoning liquid, which is, for example, the longest side length (hereinafter referred to as "long side") in a case in which the ingredients have a rectangular solid shape. In a case in which the ingredients have a cube (dice) shape, the size of the ingredients means the length of one side, and in a case in which the ingredients have a spherical or granular shape, it means the diameter. The size corresponds to a value obtained by collecting ingredients from a liquid seasoning for measurement.

The size of the ingredients after the swelling in the liquid seasoning according to one or more embodiments of the present invention may be preferably 3 to 60 mm, more preferably 5 to 50 mm, further preferably 7 to 40 mm, and most preferably 10 to 40 mm. In a case in which the size of the ingredients after the swelling is less than 3 mm, the original food texture of the ingredients is insufficient, and the flavor of the ingredients is not felt sufficiently, resulting in poor flavor of the entire seasoning. In addition, in a case in which it exceeds 60 mm, it is difficult for the ingredients to absorb the seasoning liquid. Accordingly, the flavor of the ingredients is not satisfactory, and the cooking workability also worsens.

According to one or more embodiments of the liquid seasoning of the present invention, the "content of the ingredients" means the content (wet weight) of the ingredients after the swelling in a seasoning liquid, which is expressed as a percent (%) by mass of the weight of an ingredients having a size of 3 to 60 mm with respect to the weight of the whole liquid seasoning when the ingredients after the swelling in the seasoning liquid is collected from the liquid seasoning to measure the weight, as in the case of measurement of the size of the ingredients described above.

The content of the ingredients in the liquid seasoning according to one or more embodiments of the present invention may be 20% to 80% by mass, preferably 30% to 80% by mass, more preferably 40% to 70% by mass, and most preferably 45% to 60% by mass based on the total mass of the liquid seasoning in terms of wet weight. In a case in which the content of the ingredients is less than 20% by mass in terms of wet weight, a favorable original flavor of the ingredients and a favorable ingredient-derived flavor generated when the ingredients are heated in the seasoning liquid cannot be sufficiently obtained. Accordingly, the flavor of the entire liquid seasoning is weakened and not satisfactory. In addition, in a case in which the content of the ingredients exceeds 80% by mass in terms of wet weight, the original flavor of the ingredients and the flavor of the liquid seasoning become favorable, however, the workability when using the seasoning liquid for cooking is worsened since the amount of the seasoning liquid is too little.

In a case in which the ingredients are vegetables, although type of the vegetables is not particularly limited, the vegetables may be preferably one that is eaten after heating cooking. Examples thereof include onions, cabbages, Chinese cabbages, carrots, bell peppers, radishes, radish leaves, beets, lotus roots, burdocks, green onions, Japanese basil leaves, celeries, parsleys, paprikas, tomatoes, cucumbers, corns, cauliflowers, eggplants, potatoes, sweet potatoes, taros, yams, and pumpkins. Of these, onions, cabbages, Chinese cabbages, carrots, green onions, celeries, and paprikas may be preferable, and onions, cabbages, Chinese cabbages, and carrots may be more preferable. These vegetables can be used alone or in combination of two or more types.

Examples of an ingredients to be contained in the liquid seasoning other than vegetables include fruits (lemon, yuzu, sudachi, lime, orange, grape fruit, apple, pineapple, peach, grape, strawberry, pear, banana, melon, kiwi, cassis, acerola, blueberry, apricot, guava, plum, mango, papaya, lychee, etc.), seeds and nuts (almond, peanut, pine nut, coconut, soybean, etc.), mushrooms (shimeji mushroom, shiitake mushroom, western mushroom, king oyster mushroom, maitake mushroom, etc.), and beans (soybean, peas, lentils, chickpeas, Egyptian beans etc.).

In a case in which ingredients to be contained in the liquid seasoning is dried vegetables, the water content of the dried vegetables may be preferably 8% by mass or less, more preferably 6% by mass or less, and further preferably 5% by mass or less, from the viewpoint of preventing excess water from transferring to the seasoning liquid.

The dried vegetables may also be prepared by mixing vegetables with a sugar before drying, or by immersing vegetables in a sugar-containing solution, followed by heat-mixing. Specifically, examples of such sugar include glucose, fructose, sucrose, lactose, and starch hydrolysate. Two or more of these sugars may also be used. The amount of a sugar added, mixing time, and the concentration of a sugar in the case of immersing vegetables in a sugar-containing solution, the temperature and time for the heat-mixing operation, and the temperature and time for the subsequent drying operation may be arbitrarily selected depending on the type and size of the vegetables, etc. The amount of a sugar added upon the mixing of vegetables with the sugar may be preferably 5% to 30% by mass, based on the mass of the dried vegetables. The concentration of a sugar upon immersion of vegetables in a sugar-containing solution may be preferably 5% to 30% by mass. The conditions for the heat-mixing in the solution may be preferably a temperature of 50° C. to 80° C. and a period of time of 10 minutes to 12 hours.

Moreover, the dried vegetables may also be produced by heat-mixing cut vegetables in a calcium salt solution and then drying them. The concentration of the calcium salt solution, the temperature and time for the heat-mixing operation, and the temperature and time for the subsequent drying operation may be arbitrarily selected depending on the type and size of the vegetables, etc. Specifically, the dried vegetables may be produced by stirring cut vegetables in an aqueous solution prepared by dissolving a calcium salt such as calcium chloride, calcium lactate, or calcium acetate in water to a concentration of 0.5% to 5% by mass, at 50° C. to 80° C. for 1 to 120 minutes, then separating the resultant from the treated solution for the removal of the liquid, and then drying the obtained vegetables at 65° C. to 80° C. for 3 to 12 hours. The above-described calcium aqueous solution may also comprise a sugar such as glucose, fructose, sucrose, or lactose in an amount of 5% to 30% by mass.

The dried vegetables can be produced by cutting vegetables to a predetermined size and then drying them, or by drying vegetables and then cutting them. Examples of the drying method include hot air drying, freeze drying, vacuum heat drying, microwave drying, sun drying, and natural drying.

In one or more embodiments, as the liquid seasoning contains vegetables as a main ingredient, the content of vegetable-derived γ-aminobutyric acid (GABA) is high. For example, the GABA content in the liquid seasoning may be preferably 80 ppm or more and further preferably 80 to 300 ppm. γ-Aminobutyric acid has various physiological activities effective for health promotion, such as blood pressure lowering action, psychostatic action, anti-stress action, neutral fat/cholesterol lowering action, activation of brain function (improvement of memory ability and learning ability), and can also enhance saltiness and sourness.

Water activity (Aw) is the ratio of the vapor pressure of water in a hermetically sealed vessel containing a food product to the vapor pressure of pure water at a given temperature, which is a numerical value indicating the percentage of free water in the food product that is designated as an indicator of the shelf life of the food product. The water activity (Aw) of the liquid seasoning according to one or more embodiments of the present invention may be preferably less than 0.955 and more preferably less than 0.945 in order to enable long-term storage at room temperature.

The liquid seasoning according to one or more embodiments of the present invention may contain other ingredients such as dried products of seafood (squid, shrimp, clams, scallops, mussels, etc.) meat or processed meat products (beef, chicken, pork, ham, bacon, sausages, etc.), seaweeds (Hijiki seaweed, brown seaweed, kelp, etc.), and eggs to an extent that the effect according to one or more embodiments of the present invention is not impaired. These ingredients may be used alone as a single type, or may also be used in combination of two or more types. In addition, in a case in which raw ingredients are used as an ingredient to be contained in the liquid seasoning according to one or more embodiments of the present invention, for example, when vegetables are used, grated vegetables, paste-like vegetables, or the like can also be used.

The liquid seasoning according to one or more embodiments of the present invention contains a vinegar and/or a common salt or a food product containing a common salt, in addition to the above-described ingredients.

A vinegar used for the liquid seasoning according to one or more embodiments of the present invention is not particularly limited. Examples thereof include grain vinegar, rice vinegar, apple vinegar, alcoholic vinegar, grape vinegar, synthetic vinegar, black vinegar, Chinese vinegar, sherry vinegar, malt vinegar, and balsamic vinegar. These vinegars may be used alone as a single type, or may also be used in any given combination of two or more types at any given ratio.

A common salt used for the liquid seasoning according to one or more embodiments of the present invention may be directly used, or may also be a food product containing a common salt. The food product containing a common salt is not particularly limited. Examples thereof include soy sauce, miso (soybean paste), and soup stock.

The above-described soy sauce is not particularly limited. Examples thereof include koikuchi (dark-colored) soy sauce, usukuchi (light-colored) soy sauce, white soy sauce, tamari (rich-tasting) soy sauce, and saishikomi (refermented) soy sauce. These soy sauces may be used alone as a single type, or may also be used in any given combination of two or more types at any given ratio.

The above-described miso is not particularly limited. Examples thereof include barley miso, rice miso, bean miso, and mixed miso. Other examples of the miso include aka miso (dark brown miso), shiro miso (white miso), and tanshoku miso (light colored miso), which are named based on the color difference caused by the production method thereof. These miso products may be used alone as a single type, or may also be used in any given combination of two or more types at any given ratio.

In a case in which the above-described common salt or a food product containing a common salt is used, the common salt content in the seasoning may be preferably 0.5% to 20.0% and more preferably 0.8% to 10.0%. The content of the common salt can be measured by the potentiometric titration method or the Mohr method according to the Japanese Agricultural Standards for soy sauce.

The liquid seasoning according to one or more embodiments of the present invention may contain taste/flavor components such as a sugar, a high-intensity sweetener, an amino acid-based seasoning, a nucleic acid-based seasoning, an organic acid-based seasoning, a flavoring material, an umami seasoning, a liquor, a flavor oil, a flavor, and a spice extract, and also additives such as a viscosity adjuster, a stabilizer, a pH adjuster, and a coloring agent, if necessary. The contents of these components are not particularly limited, and can be determined, as appropriate, depending on intended use.

Examples of the above-described sugar include sucrose, maltose, fructose, isomerized glucose syrup, glucose, starch syrup, dextrin, and sugar alcohols such as sorbitol, maltitol, and xylitol. These sugars may be used alone as a single type, or may also be used in any given combination of two or more types at any given ratio.

Examples of the above-described high-intensity sweetener include aspartame, acesulfame potassium, sucralose, saccharin (sodium saccharin), neotame, licorice extract, stevia, and an enzyme-treated product thereof. These high-intensity sweeteners may be used alone as a single type, or may also be used in any given combination of two or more types at any given ratio.

Examples of the above-described amino acid-based seasoning include L-sodium glutamate, DL-alanine, glycine, L- or DL-tryptophan, L-phenylalanine, L- or DL-methionine, L-lysine, L-aspartic acid, sodium L-aspartate, and L-arginine. These amino acid-based seasonings may be used alone as a single type, or may also be used in any given combination of two or more types at any given ratio.

Examples of the above-described nucleic acid-based seasoning include disodium 5'-inosinate, disodium 5'-guanylate, disodium 5'-uridylate, disodium 5'-cytidylate, calcium 5'-ribonucleotide, and disodium 5'-ribonucleotide. These nucleic acid-based seasonings may be used alone as a single type, or may also be used in any given combination of two or more types at any given ratio.

Examples of the above-described organic acid-based seasoning include calcium citrate, trisodium citrate, potassium gluconate, sodium gluconate, succinic acid, monosodium succinate, disodium succinate, sodium acetate, Potassium DL-hydrogen tartrate, Potassium L-hydrogen tartrate, Sodium DL-tartrate, Sodium L-tartrate, potassium lactate, calcium lactate, sodium lactate, monosodium fumarate, and Sodium DL-malate. These organic acid-based seasonings may be used alone as a single type, or may also be used in any given combination of two or more types at any given ratio. The combined use of two or more organic acid-based seasonings may be preferable because both tastes are synergistically enhanced.

Examples of the above-described flavoring material include soup stock from dried and smoked bonito, kelp soup stock, vegetable extract, bonito extract, kelp extract, seafood extract, poultry extract, and fruit juice. These flavoring materials may be used alone as a single type, or may also be used in any given combination of two or more types at any given ratio.

Examples of the above-described umami seasoning include protein hydrolysate and yeast extract. These umami seasonings may be used alone as a single type, or may also be used in any given combination of two or more types at any given ratio.

The above-described liquor include refined sake, synthetic refined sake, mirin (sweet cooking rice wine), Shochu (traditional Japanese distilled spirit), wine, liqueur, and Chinese (Shaoxing) rice wine. These liquors may be used alone as a single type, or may also be used in any given combination of two or more types at any given ratio.

Examples of the above-described flavor oil include ginger oil, garlic oil, mustard oil, onion oil, sesame oil, green onion oil, leek oil, dropwort Japanese parsley oil, Japanese basil oil, Japanese horseradish oil, lemon oil, seafood oil, and poultry oil. These flavor oils may be used alone as a single type, or may also be used in any given combination of two or more types at any given ratio.

Examples of the above-described flavor include ginger flavor, garlic flavor, mustard flavor, onion flavor, sesame flavor, green onion flavor, leek flavor, Japanese basil flavor, Japanese horseradish flavor, and lemon flavor. These flavors may be used alone as a single type, or may also be used in any given combination of two or more types at any given ratio.

The above-described spice extract is not particularly limited, as long as it is an extract from food products, which is generally displayed as "spice." Examples of the spice extract include capsicum extract, mustard extract, ginger extract, Japanese horseradish extract, pepper extract, garlic extract, onion extract, and Japanese pepper extract. These spice extracts may be used alone as a single type, or may also be used in any given combination of two or more types at any given ratio.

Examples of the above-described viscosity adjuster include gum Arabic, alginic acid, sodium alginate, carrageenan, karaya gum, agar, locust bean gum, xanthan gum, guar gum, gellan gum, cellulose, tamarind seed gum, tara gum, tragacanth gum, pullulan, pectin, chitin, chitosan, and processed starch. These viscosity adjusters may be used alone as a single type, or may also be used in any given combination of two or more types at any given ratio.

The pH of the seasoning liquid in the liquid seasoning according to one or more embodiments of the present invention may be preferably 2 to 5, more preferably 2.5 to 4.5, and further preferably 3 to 4 from the viewpoint of maintaining a food texture. In a case in which the pH is less than 2, it makes it difficult to maintain a favorable food texture during storage. In a case in which the pH exceeds 5, it requires heat sterilization to an extreme extent, which makes it difficult to maintain a favorable food texture.

A vessel used in one or more embodiments of the present invention is not particularly limited in terms of material or shape as long as it can be hermetically sealed. However, examples thereof include a plastic-made vessel, a pouch (a polyethylene pouch or an aluminum pouch), a PET bottle, a steel can, an aluminum can, and a bottle vessel. In particular, a wide-mouthed vessel may be preferable because an ingredient and a seasoning liquid can be easily filled and removed, and a plastic cup type vessel may be more preferable because it can be hermetically sealed by heat sealing a film material to its opening in order to ensure high sealing performance and heat resistance.

The ingredient-containing liquid seasoning packed in a hermetically sealed vessel according to one or more embodiments of the present invention can be produced by a method comprising: a step of introducing ingredients into the above-described hermetically sealed vessel, adding a seasoning liquid, and then hermetically sealing the vessel; a step of subjecting the hermetically sealed vessel filled with the ingredients and the seasoning liquid to a heat treatment without stirring; and a step of leaving or cooling the resultant to ordinary temperature after the heat treatment. The above-described heat treatment is carried out by placing the vessel which has been filled with the ingredients and the seasoning liquid and hermetically sealed under the presence of hot air, hot water, hot water shower, steam, or the like without stirring during the heat treatment. The heat treatment can be a temperature increasing heat treatment or a constant-temperature heat treatment. The temperature increasing heat treatment is a heat treatment, in which the temperature is increased to a predetermined temperature and the heating is terminated when the temperature reaches the predetermined temperature. The constant-temperature heat treatment is a heat treatment, in which the temperature is increased to a predetermined temperature, and after the temperature has reached the predetermined temperature, a constant temperature is maintained. Heating temperature is a temperature in a heating environment, and it may be preferably 60° C. to 100° C., more preferably 65° C. to 95° C., and further preferably 70° C. to 95° C. In the case of the temperature increasing heat treatment, the heat treatment time is a time necessary for a temperature of 60° C. to reach the predetermined temperature, and in the case of the constant-temperature heat treatment, the heat treatment time is a total of a time necessary for a temperature of 60° C. to reach the predetermined temperature and a time necessary for maintaining the constant temperature. The heating time may be adjusted depending on the temperature, as appropriate, and it may be preferably 20 to 120 minutes, more preferably 20 to 100 minutes, and further preferably 30 to 90 minutes. In the case of the constant-temperature heat treatment, the time necessary for keeping the predetermined temperature is preferably 5 to 110 minutes, more preferably 5 to 90 minutes, and further preferably 10 to 80 minutes, within the above-described heating time.

The liquid seasoning according to one or more embodiments of the present invention can be used for a seasoning for hot-pots, a seasoning for noodles, a seasoning for rice, a seasoning for Kamameshi (Japanese rice pilaf cooked in an iron pot), a seasoning for foods dressed with a thick starchy sauce, a seasoning for grilled meats, a seasoning for daily dishes, a seasoning for tofu, a seasoning for Chinese fried rice, a seasoning for tendon (a bowl of rice topped with tempura), a seasoning for sesame sauce, a seasoning for dumplings, a seasoning for aemono (sauce-dressed dishes), a seasoning for hamburger steaks, a seasoning for steaks, a seasoning for sauteed food, a seasoning for microwave, a seasoning for Sundubu-jjigae, a seasoning for stir-fry, a seasoning for Takikomi Gohan (Japanese rice dishes seasoned and cooked with various ingredients), a seasoning for Gomoku Gohan (Japanese rice dishes seasoned and cooked with various ingredients), a seasoning for kimuch, a seasoning for fried food, a seasoning for ramen noodles, a seasoning for stewed dishes, a seasoning for Shabu Shabu, or a seasoning for dip, a seasoning for pasta, a seasoning for soup, a seasoning for salads, a seasoning for sandwich, and the like. The liquid seasoning according to one or more embodiments of the present invention may be particularly preferably used particularly as a seasoning for heating cooking to be added during or after heating cooking such as a seasoning for grilled meats, a seasoning for daily dishes, a seasoning for pasta, a seasoning for Chinese fried rice, a seasoning for soup, or a seasoning for dumplings.

EXAMPLES

Hereinafter, one or more embodiments of the present invention will be more specifically described in the following examples. However, the present invention is not limited to these examples.

(Test Example 1) Studies Regarding Ingredient Size (1) Preparation of Test Products (Examples 1 to 5 and Comparative Examples 1 and 2)

The outer skin was removed from onions and the onions were grated or cut into sizes of 1 mm square, 4 mm square, and 7 mm square, and sizes of 5 mm short side and 15 mm long side, 40 mm long side, and 60 mm long side. Subsequently, grated or cut onions were hot-air dried to prepare ingredients.

A seasoning liquid was prepared by mixing 23% by mass of liquid sugar, 23% by mass of koikuchi (dark-colored) soy sauce (common salt content: 18%), 20% by mass of brewed vinegar (acidity: 15%), 8% by mass of starch syrup, and 8% by mass of red wine into water.

Each of the above-described ingredients was filled into a wide-mouthed cup so as to adjust the content (wet weight) of the ingredients after the swelling in the seasoning liquid based on the total mass of the liquid seasoning to the corresponding content shown in Table 1. The seasoning liquid was added thereto and the cup was sealed with an aluminum sheet. Heating was started with steam by a high temperature heat treatment machine to increase the temperature from 60° C. to 85° C. for 10 minutes and then heat treatment was performed at 85° C. for 50 minutes. Thereafter, each cup was cooled in cold water to room temperature, thereby obtaining an ingredient-containing liquid seasoning packed in a hermetically sealed vessel as a test product.

(2) Evaluation Method (Measurement of γ-Aminobutyric Acid)

Each test product prepared in (1) was diluted with water and a lithium citrate buffer (pH 2.2), and was then filtered through a 0.45-μm filter. Thereafter, γ-aminobutyric acid in the obtained filtrate was analyzed using an amino acid analyzer (JCL-500/V, manufactured by JEOL Ltd.).

(Measurement of Water Activity)

Water activity measurement was performed using a water activity measurement instrument (TH-500 AW SPRINT, manufactured by Novasina) under measurement conditions of 20° C.±0.5° C.

(Sensory Evaluation Method)

A frying pan was preheated and salad oil was poured thereinto to form a thin oil layer. Then, about 240 g of thinly sliced pork was heated therein over medium heat until the meat became browned. Next, 240 g of the ingredient-containing seasoning of a test product in each wide-mouth cup was added and sufficiently mixed with the meat while heating over medium heat for 5 minutes.

After cooking, the sensory evaluation was carried out with five inspectors trained for the sensory test, in accordance with the following evaluation criteria. As a method for calculating the score in each evaluation item (flavor of the entire dish, ingredient-derived flavor, and satisfaction in eating of food materials (ingredients)), a weighted average was calculated from the evaluation scores obtained by the five inspectors, and the obtained value was then rounded off to two decimal places. The comprehensive evaluation was obtained by calculating a weighted average from the score of each evaluation item. Three points that are the intermediate point of the 5-point evaluation were defined as a passing score (effective). Three and half points higher than the three points were evaluated to have favorable effects, and four points or higher were evaluated to have better effects.

<Flavor of the Entire Dish>
 5: Very good
 4: Good
 3: Somewhat good
 2: Somewhat poor
 1: Poor <Onion-Derived Flavor>
 5: Very sufficiently felt
 4: Sufficiently felt
 3: Felt
 2: Poorly felt
 1: Hardly felt <Satisfaction in Eating of Ingredients>
 5: Very good
 4: Good
 3: Somewhat good
 2: Somewhat poor
 1: Poor (3) Evaluation Results The size of the ingredients (mm) after the swelling in the seasoning liquid, the content of the ingredients (% by mass) after the swelling in the seasoning liquid, water activity, the γ-aminobutyric acid (GABA) content (ppm) of each test product, and the results of the sensory evaluation are shown in Table 1.

As shown in Table 1, the liquid seasonings of Examples 1 to 5, each of which contained vegetable ingredients having a size of 3 to 60 mm as swollen ingredients, had a favorable flavor of the entire dish and a good onion-derived flavor, provided satisfaction in eating of ingredients, and were excellent in terms of comprehensive evaluation.

Meanwhile, the liquid seasonings of Comparative Examples 1 and 2, each of which contained vegetable ingredients having a size of less than 3 mm as swollen ingredients, did not have a favorable flavor of the entire dish and a good onion-derived flavor, did not provide satisfaction in eating of ingredients, and were poor in terms of comprehensive evaluation.

(Test Example 2) Studies Regarding Ingredient Content (1) Preparation of Test Products (Examples 6 to 9 and Comparative Example 3 and 4)

The outer skin was removed from onions and the onions were grated or cut into a size of 15 mm long side and 5 mm short side. Subsequently, cut onions were hot-air dried to prepare ingredients.

An ingredient-containing liquid seasoning packed in a hermetically sealed vessel was obtained as a test product for each of the above-described ingredients in the same manner as in Test Example 1 except that the ingredients was filled into a wide-mouthed cup to adjust the content (wet weight) of the ingredients after the swelling in the seasoning liquid based on the total mass of the liquid seasoning to the corresponding content shown in Table 2 below.

(2) Evaluation Method

The test products prepared in (1) were evaluated in the same manner as in Test Example 1.

(3) Evaluation Results

The content of the ingredients (% by mass) after the swelling in the seasoning liquid, water activity, the γ-aminobutyric acid (GABA) content (ppm) of each test product, and the results of the sensory evaluation are shown in Table 2.

TABLE 1

|  | Example | | | | | Comparative Example | |
| --- | --- | --- | --- | --- | --- | --- | --- |
|  | 1 | 2 | 3 | 4 | 5 | 1 | 2 |
| Size of ingredients (mm) | 4 | 7 | 15 | 40 | 60 | 1 | <1 |
| Content of Ingredients (% by mass) | 61 | 59 | 56 | 70 | 70 | 69 | 56 |
| Water activity | 0.933 | 0.935 | 0.935 | 0.922 | 0.921 | 0.945 | 0.935 |
| GABA content (ppm) | 93 | 90 | 89 | 180 | 195 | 74 | 100 |
| <Sensory evaluation results> | | | | | | | |
| Flavor of the entire dish | 2.6 | 3.8 | 5 | 4.4 | 4.6 | 2.0 | 1.0 |
| Onion-derived flavor | 3.8 | 3.6 | 4.8 | 4.2 | 4.2 | 1.8 | 1.4 |
| Satisfaction in eating of ingredients | 3.0 | 3.6 | 4.8 | 4.4 | 4.4 | 1.2 | 1.0 |
| Comprehensive evaluation | 3.1 | 3.7 | 4.9 | 4.3 | 4.4 | 1.7 | 1.1 |

TABLE 2

|  | Example | | | | Comparative Example | |
| --- | --- | --- | --- | --- | --- | --- |
|  | 6 | 7 | 8 | 9 | 3 | 4 |
| Content of ingredients (% by mass) | 28 | 46 | 57 | 77 | 14 | 100 |
| Water activity | 0.950 | 0.938 | 0.941 | 0.934 | 0.951 | 0.918 |
| GABA content (ppm) | 102 | 129 | 144 | 173 | 80 | 231 |
| <Sensory evaluation results> | | | | | | |
| Flavor of the entire dish | 3.4 | 5.0 | 5.0 | 4.4 | 2.7 | 3.8 |
| Onion-derived flavor | 3.2 | 4.8 | 4.8 | 4.6 | 2.0 | 3.6 |
| Satisfaction in eating of ingredients | 3.6 | 4.8 | 4.8 | 3.8 | 2.0 | 3.0 |
| Comprehensive evaluation | 3.4 | 4.9 | 4.9 | 4.3 | 2.2 | 3.5 |

As shown in Table 2, the liquid seasonings of Examples 6 to 9, each of which contained vegetable ingredients having a specific size (15 mm long side) at a content in a range of 20% to 80% by mass, had a favorable flavor of the entire dish and a good onion-derived flavor, provided satisfaction in eating of ingredients, and were excellent in terms of comprehensive evaluation.

Meanwhile, the liquid seasoning of Comparative Example 3 having an ingredient content of less than 20% by mass did not have a favorable flavor of the entire dish and a good onion-derived flavor, did not provide satisfaction in eating of ingredients, and was poor in terms of comprehensive evaluation. In addition, the liquid seasoning of Comparative Example 4 having an ingredient content of 100% by mass did not include a liquid portion but consisted of ingredients. Therefore, this test product is not encompassed by the liquid seasoning according to one or more embodiments of the present invention. However, the results are described as a reference example for indicating that a flavor and satisfaction in eating of ingredients are acceptable levels even when increasing the content of the ingredients.

An ingredient-containing liquid seasoning packed in a hermetically sealed vessel was obtained as a test product for each of the above-described ingredients in the same manner as in Test Example 1 except that the ingredients were filled into a wide-mouthed cup to adjust the content (wet weight) of the ingredients after the swelling in the seasoning liquid based on the total mass of the liquid seasoning to the corresponding content shown in Table 3 below.

(2) Evaluation Method

The test products prepared in (1) were evaluated in the same manner as in Test Example 1.

(3) Evaluation Results

Type of the ingredients, the content of the ingredients (% by mass) after the swelling in the seasoning liquid, water activity, the γ-aminobutyric acid (GABA) content (ppm) of each test product, and the results of the sensory evaluation are shown in Table 3.

TABLE 3

|  |  | Example | | | Comparative Example |
| --- | --- | --- | --- | --- | --- |
|  |  | 10 | 11 | 12 | 5 |
| Content of ingredients (% by mass) | Onion (dried) | 20 | — | — | — |
|  | Carrot (dried) | 30 | — | — | — |
|  | Cabbage (dried) | — | 50 | — | — |
|  | Onion (raw) | — | — | 28 | — |
|  | Onion (frozen) | — | — | — | 28 |
| Water activity |  | 0.934 | 0.929 | 0.951 | 0.950 |
| GABA content (ppm) |  | 90 | 121 | 71 | 71 |
| <Sensory evaluation results> | | | | | |
| Flavor of the entire dish |  | 3.8 | 4.4 | 4.0 | 3.2 |
| Onion-derived flavor |  | 3.6 | 4.6 | 3.4 | 2.4 |
| Satisfaction in eating of ingredients |  | 4.0 | 3.8 | 3.8 | 3.0 |
| Comprehensive evaluation |  | 3.8 | 4.3 | 3.7 | 2.9 |

(Test Example 3) Studies Regarding Type of Ingredients (1) Preparation of Test Products (Examples 10 to 12, Comparative Example 5)

Onions, carrots, and cabbages were grated or cut into a size of 20 mm long side and 5 mm short side. Subsequently, each cut ingredient was hot-air dried. The cut onions were partially not dried and used as raw onions or frozen at −20° C. overnight before use.

As shown in Table 3, each liquid seasoning, for which a mixture of onions and carrots (Example 10), cabbages (Example 11), or onions (Example 12) was used as ingredients, also had a favorable flavor of the entire dish and a good onion-derived flavor, provided satisfaction in eating of ingredients, and was excellent in terms of comprehensive evaluation. Meanwhile, the liquid seasoning of Comparative Example 5, for which frozen ingredients were used as ingredients, did not have a favorable flavor of the entire dish and a good onion-derived flavor, did not provide satisfaction in eating of ingredients, and was unsatisfactory in terms of comprehensive evaluation, even though the ingredient content was in the specific range.

(Test Example 4) Studies Regarding Heating Temperature and Time (1) Preparation of Test Products (Examples 13 to 17 and Comparative Example 6)

The outer skin was removed from onions and the onions were grated or cut into a size of 20 mm long side and 5 mm short side. The cut onions were hot-air dried.

Each of the above-described ingredients was filled into a wide-mouthed cup so as to adjust the content of the ingredients after the swelling in the seasoning liquid to 58% by mass of the entire liquid seasoning, and then, the seasoning liquid was added thereto and the cup was sealed with an aluminum sheet. Next, in Examples 13 to 16, heating was started with steam by a high temperature heat treatment machine to increase the temperature from 60° C. to the corresponding temperature shown in Table 4 for 10 minutes, and then, heat treatment was performed at a constant-temperature level for the corresponding period of time shown in Table 4 (constant-temperature heat treatment). In Example 17, heating was started with steam by a high temperature heat treatment machine to increase the temperature from 60° C. to 90° C. for 20 minutes and then heating was discontinued (temperature increasing heat treatment). After each heat treatment, the cup was cooled in cold water to room temperature, thereby obtaining an ingredient-containing liquid seasoning packed in a hermetically sealed vessel of each test product.

(2) Evaluation Method

The test products prepared in (1) were directly used for conducting evaluation of the liquid seasonings according to the following criteria. In addition, the test products were used for conducting evaluation of cooking in the same manner as in Test Example 1.

<Flavor of the Entire Liquid Seasoning>
 5: Very good
 4: Good
 3: Somewhat good
 2: Somewhat poor
 1: Poor <Onion-Derived Flavor>
 5: Very sufficiently felt
 4: Sufficiently felt
 3: Felt
 2: Poorly felt
 1: Hardly felt <Satisfaction in Eating of Ingredients>
 5: Very good
 4: Good
 3: Somewhat good
 2: Somewhat poor
 1: Poor (3) Evaluation Results The heating temperature, heating time, water activity, the γ-aminobutyric acid (GABA) content (ppm) of each test product, and the results of the sensory evaluation are shown in Table 4.

TABLE 4

|  | Example | | | | | Comparative Example |
| --- | --- | --- | --- | --- | --- | --- |
|  | 13 | 14 | 15 | 16 | 17 | 6 |
| Heating temperature (° C.) | 65 | 75 | 85 | 100 | 90 | 120 |
| Constant-temperature heating time (min) | 50 | 50 | 50 | 50 | 0 | 10 |
| Water activity | 0.94 | 0.942 | 0.938 | 0.936 | 0.936 | 0.938 |
| GABA content (ppm) | 122 | 129 | 129 | 151 | 145 | 158 |
| <Sensory evaluation results of liquid seasoning> | | | | | | |
| Flavor of the entire seasoning liquid | 4.5 | 4.8 | 5.0 | 4.1 | 3.7 | 2.7 |
| Onion-derived flavor | 4.7 | 4.7 | 4.8 | 3.6 | 3.5 | 2.7 |
| Satisfaction in eating of ingredients | 4.0 | 4.7 | 4.5 | 3.1 | 3.8 | 2.8 |
| Comprehensive evaluation | 4.4 | 4.7 | 4.8 | 3.6 | 3.7 | 2.7 |
| <Sensory evaluation results of dish> | | | | | | |
| Flavor of the entire dish | 4.5 | 4.8 | 5.0 | 4.1 | 3.7 | 3.0 |
| Onion-derived flavor | 4.5 | 4.5 | 4.7 | 3.8 | 3.7 | 2.8 |
| Satisfaction in eating of ingredients | 4.0 | 4.7 | 4.5 | 3.3 | 3.8 | 2.7 |
| Comprehensive evaluation | 4.3 | 4.7 | 4.7 | 3.7 | 3.7 | 2.8 |

As shown in Table 4, the liquid seasonings of Examples 13 to 16, each of which contained a specific amount (58% by mass) of vegetable ingredients having a specific size (20 mm long side) and was subjected to constant-temperature heat treatment in a temperature range of 65° C. to 100° C. for 50 minutes, had a favorable flavor of the entire seasoning liquid and a favorable flavor of the entire dish and a good onion-derived flavor, provided satisfaction in eating of ingredients, and were significantly excellent in terms of comprehensive evaluation. In addition, the liquid seasoning of Example 17, which had been subjected to temperature increasing heat treatment, was also satisfactory in terms of the flavor of the entire seasoning liquid and the entire dish, the onion-derived flavor, satisfaction in eating of ingredients, and comprehensive evaluation of those items.

Meanwhile, the liquid seasoning of Comparative Example 6, which was treated under heating conditions for usual retort processing, was not satisfactory in terms of a flavor of the entire seasoning liquid, a flavor of the entire dish, an onion-derived flavor, and satisfaction in eating of ingredients, and was also poor in terms of comprehensive evaluation.

(Test Example 5) Example of Use for Cooking (1) Use for Pasta Sauce (Cooking Example 1)

Commercially available dry pasta (spaghetti) in an amount of 200 g was boiled, and the boiled pasta was mixed with 240 g of the ingredient-containing liquid seasoning obtained in Example 15 or Comparative Example 6 and 70 g of commercially available canned tuna and stir-fried in a frying pan over medium heat for 3 minutes. The sensory evaluation was carried out for each obtained pasta dish with five inspectors trained for the sensory test in the same manner as in Test Example 1. The obtained results of the sensory evaluation are shown in Table 5 below.

(2) Use for Egg Soup (Cooking Example 2)

To 400 ml of boiling water, 240 g of the ingredient-containing liquid seasoning obtained in Example 15 or Comparative Example 6 was added, and then, one beaten egg was poured there into evenly, thereby obtaining egg soup. The sensory evaluation was carried out for each obtained egg soup with five inspectors trained for the sensory test in the same manner as in Test Example 1. The obtained results of the sensory evaluation are shown in Table 5 below.

TABLE 5

| Ingredient-containing liquid seasoning | Cooking Example 1 (Pasta sauce) | | Cooking Example 2 (Egg soup) | |
|---|---|---|---|---|
| | Example 15 | Comparative Example 6 | Example 15 | Comparative Example 6 |
| <Sensory evaluation results> | | | | |
| Flavor of the entire dish | 3.8 | 3.0 | 3.4 | 2.2 |
| Onion-derived flavor | 4.4 | 2.8 | 3.8 | 2.4 |
| Satisfaction in eating of ingredients | 4.4 | 2.4 | 4.4 | 2.0 |
| Comprehensive evaluation | 4.2 | 2.7 | 3.9 | 2.2 |

As shown in Table 5, each of the pasta and egg soup, for which the seasoning of Example 15 was used as the liquid seasoning comprising ingredients according to one or more embodiments of the present invention, was satisfactory in terms of a flavor of the entire dish, an ingredient-derived flavor, and satisfaction in eating of ingredients. Meanwhile, each of the pasta and egg soup cooked with the liquid seasoning of Comparative Example 6, which was subjected to heat treatment under the conditions that did not fall within the specific range, was not satisfactory.

One or more embodiments of the present invention can be utilized in the field of manufacturing liquid seasonings that can be easily used in heating cooking, etc.

All publications, patents, and patent applications cited in the present description are incorporated herein by reference in their entirety.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. An ingredient containing liquid seasoning packed in a hermetically sealed vessel, comprising:
   ingredients; and
   a seasoning liquid,
   wherein the seasoning liquid contains 80 to 300 ppm of γ-aminobutyric acid,
   wherein the ingredients are swollen in the seasoning liquid,
   wherein the pH is from 2 to 5,
   wherein a size of the swollen ingredients ranges from 10 to 60 mm, and
   wherein the swollen ingredients represent 20 to 80% by mass based on the total mass of the liquid seasoning in terms of wet weight.

2. The ingredient-containing liquid seasoning according to claim 1, wherein the ingredients are dried ingredients that are swollen in the seasoning liquid.

3. The ingredient-containing liquid seasoning according to claim 2, wherein the water content of the dried vegetables is 8% by mass or less.

4. The ingredient-containing liquid seasoning according to claim 2, wherein the dried ingredients are at least one selected from the group consisting of onion, cabbage, Chinese cabbage, carrot, green onion, celery, and bell pepper.

5. The ingredient-containing liquid seasoning according to claim 1, wherein the ingredient-containing liquid seasoning has a water activity of less than 0.955.

6. The ingredient-containing liquid seasoning according to claim 1, further comprising a vinegar and/or a common salt or a food product containing a common salt.

7. The ingredient-containing liquid seasoning according to claim 1, wherein the hermetically sealed vessel is a wide-mouthed vessel.

* * * * *